United States Patent [19]

MacSpadden et al.

[11] 4,081,734
[45] Mar. 28, 1978

[54] PNEUMATIC FAIL-SAFE SENSOR SYSTEM FOR N/C MACHINE TOOL

[75] Inventors: Floyd E. MacSpadden, Kent; Frank A. Schellhase, Issaquah; Robert L. Strong, Auburn; Jansey D. Tieden, Puyallup, all of Wash.

[73] Assignee: The Boeing Company, Seattle, Wash.

[21] Appl. No.: 710,625

[22] Filed: Aug. 2, 1976

Related U.S. Application Data

[62] Division of Ser. No. 518,090, Oct. 25, 1974, Pat. No. 3,991,653.

[51] Int. Cl.² .............................................. G05D 16/00
[52] U.S. Cl. ..................... 318/645; 318/578; 251/3
[58] Field of Search ............. 318/645, 578; 251/3

[56] References Cited

U.S. PATENT DOCUMENTS

| | | | |
|---|---|---|---|
| 2,838,268 | 6/1958 | Ryckman | 251/3 |
| 3,743,910 | 7/1973 | Wise | 318/578 |

*Primary Examiner*—B. Dobeck

*Attorney, Agent, or Firm*—Christensen, O'Connor, Johnson & Kindness

[57] ABSTRACT

A pneumatic fail-safe sensor system including a probe adapted to monitor the outline of a master pattern as the directed cutter spindle system of an N/C machine tool forms a part is disclosed. When the probe impinges on the master pattern to indicate that the cutter is deviating from the desired path of travel, a valve is opened and causes a pressure drop that actuates a pressure switch. The valve includes a pressurized dome that presses a valve plate against a valve seat. A valve stem is attached to the valve plate and supports the probe. Movement of the probe disturbs the static pressure of an annular chamber contained wholly within the valve seat area and, thereby, creates the pressure drop that activates the pressure switch. Activation of the pressure switch causes an electronic circuit to energize the control system of the N/C machine tool that terminates its operation by deenergizing the blocking valves. In addition to master pattern sensing, the pneumatic sensor also includes means for blowing metal ships and the like away from the tip of the probe.

15 Claims, 3 Drawing Figures

PNEUMATIC FAIL-SAFE SENSOR SYSTEM FOR N/C MACHINE TOOL

This is a continuation, divisional of application Ser. No. 518,090, filed Oct. 25, 1974 now U.S. Pat. No. 3,991,653.

BACKGROUND OF THE INVENTION

This invention is directed to numerically controlled (N/C) machine tools and, more particularly, to fail-safe devices adapted to sense when N/C machine tool cutters deviate from their desired path of travel.

N/C machine tools, such as multi-spindle horizontal profilers and single-spindle vertical hydrotels, for examples, have found widespread use in a variety of fields. In general, N/C machine tools are machine tools whose cutters (or, in reverse, where the cutter is stationary, the part being cut) are program controlled, as opposed to manually controlled by an operator. In some cases, the machine tools are controlled by suitably programmed general purpose digital computers. In other cases, hard wired controllers are utilized to control the machine tools. Since the control and operation of such machines is known, it will not be discussed here in detail.

One of the problems with N/C machine tools is determining whether or not they are operating in the desired manner, i.e., whether or not they are producing parts of the right size and shape, within certain tolerance requirements. Because many parts must be machined to fine tolerances, obviously, visual observation of the part as it is being produced is inadequate to determine if these machines are operating satisfactorily. Thus, other techniques must be used. One prior art technique that is used to insure the fail-safe operation of N/C machine tools is to associate a probe with the cutter being driven. The probe is associated with the cutter in a manner such that it moves in a path of travel defined by the movement of the cutter. As the probe is thusly moved, it follows the outline of a master pattern. If the cutter deviates from its desired path of travel, the probe comes in contact with the master pattern and closes an electrical current path that, in turn, causes an electronic circuit to be activated and halts all axis motion.

While systems of the foregoing nature have found use, they have a variety of disadvantages. Because electrical probe/master pattern contact is involved, a low voltage must be present on the probe at all times. This low voltage results in operator discomfort and disconcerting spark jump. Moreover, because the probe must be cut substantially smaller (by for example 0.010 inches) than the size of the actual cutter, in order to maintain an open probe/master pattern circuit status during programmed cutter path travel, an initial undercut of the part being formed must occur before the shutdown sequence is initiated. Thus, depending upon the required tolerances, the part being cut could become unacceptable before machine operation is terminated. In addition, false probe/master pattern contact signals (known as touche' signals) are initiated by chips, high conductivity coolant and airborne particles coming between the probe and the master pattern. When such false touche' signals occur, the cutting sequence usually must return to a start point and the complete cutting cycle repeated before the part is finished. In addition, prior art devices of this nature have required that the probe and its associated slide system be solidly mounted to prevent vibration from creating false signals. However, solid mounting often results in probe damage and misalignment when an actual touche' occurs.

Therefore, it is an object of this invention to provide a fail-safe sensor system suitable for use with N/C machine tools, and the improved N/C machine tool formed by the resultant combination.

It is another object of this invention to provide a sensor system suitable for use with an N/C machine tool that does not require current to flow through a probe and a master pattern to indicate the occurrence of a touche'.

It is a further object of this invention to provide a sensor for an N/C machine tool having a probe suitable for following a master pattern at separation distances in the thousandths of an inch range.

It is also an object of this invention to provide a sensor suitable for use in an N/C machine tool that includes a mechanism for preventing chips and airborne particles from creating false touche' signals.

It is a still further object of this invention to provide a sensor suitable for use in an N/C machine tool wherein a touche' does not cause damage to the sensor.

It is yet another object of this invention to provide a sensor system suitable for use in an N/C machine tool that includes a nonelectric master pattern sensor probe and an electronic system that responds to a false touche' signal in a rapid manner.

SUMMARY OF THE INVENTION

In accordance with principles of this invention a pneumatic fail-safe sensor system for numerically controlled machine tools is provided. The pneumatic sensor system includes a pneumatic sensor and a fast acting electronic circuit. The pneumatic sensor includes a probe adapted to follow the outline of a master pattern as a cutter forming part of an N/C machine tool cuts a part. When the probe impinges on the master pattern (a touche' occurs) to indicate that the cutter is deviating from the desired path of travel, a valve is opened and causes a pressure drop to occur. The pressure drop activates a pressure switch that, in turn, causes the electronic circuit to activate a thyristor control. The thyristor control terminates the operation of the N/C machine tool by deenergizing its blocking valves. In addition, the electronic circuit applies a signal to the numerical control system which causes it to be placed in a cycle hold state.

In accordance with further principles of this invention, the valve includes a dome enclosed on one end by a valve seat. Mounted in the dome, on the valve seat, is a valve plate. Projecting outwardly from the valve plate is a valve stem which supports the probe. Pressure inside the dome is balanced against movement of the probe caused by a touche'. When a touche' occurs, the valve opens and causes the pressure drop which activates the pressure switch.

In accordance with further principles of this invention, the probe and valve stem include a conduit adapted to create an air passageway which allows air to be exhausted at the probe tip. The exhausting air blows chips and airborne particles away from the probe tip to prevent false touche' signals from being generated.

In accordance with still further principles of this invention, the electronic circuit includes a low voltage DC portion and a high voltage AC portion. The low voltage DC portion includes a detector for sensing the status of the pressure switch and a resettable latch which is activated when a touche' is detected (the pressure switch is activated). In addition, a run-setup selector adapted to prevent the deenergization of the N/C machine tool during the initial machine setup is provided by inhibiting the operation of the output of the touche' detector.

In accordance with still further principles of this invention, the low voltage DC portion of the electronic circuit is coupled to the high voltage AC portion by an optical isolator. In addition, the high voltage AC portion includes a zero crossing detector/trigger and the thyristor control. When a touche' is detected, the thyristor control is activated the next time the applied AC energy crosses zero.

It will be appreciated from the foregoing brief summary that the invention provides a pneumatic sensor system suitable for use in an N/C machine tool. Because the sensor is pneumatic, as opposed to electric, operator discomfort and spark jump do not occur. Hence, these disadvantages of prior art all electrical systems are eliminated. Moreover, because the gap between the probe and the master pattern does not need to be wide enough to prevent spark jump, the probe can be spaced closer to the master pattern than can all electric system probes. For example, the probe can follow the master pattern by a separation distance of 0.001 inches, as opposed to 0.010 inches. Furthermore because chips and other airborne particles are blown away from the probe, false touche' signals initiated by such particles cannot occur. Further, utilization of a valve assembly as part of the sensor allows the probe to be movable in a manner such that probe damage and misalignment will not occur when an actual touche' occurs. Hence, the invention overcomes the prior art problems discussed above.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENT

Figure 1:
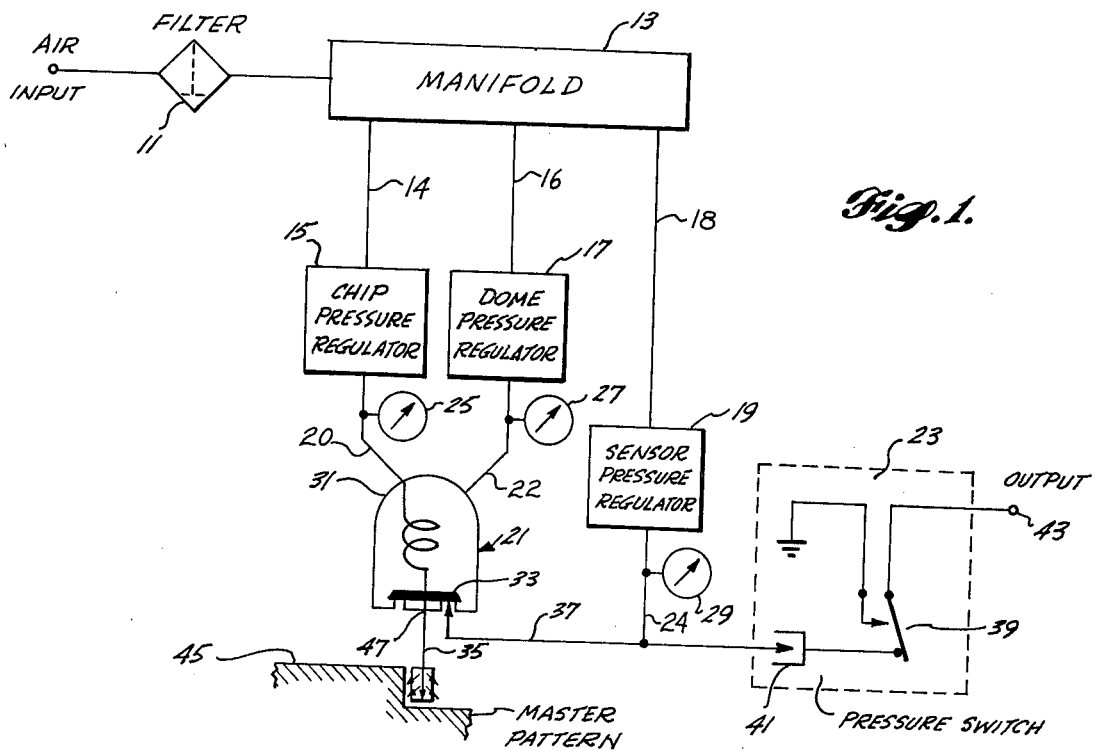
FIG. 1 is a block diagram of the pneumatic portion of the pneumatic sensor system of the invention.

FIG. 1 is a schematic diagram of the pneumatic portion of the pneumatic sensor system of the invention. FIG. 1 comprises: a filter 11; a manifold 13; a chip pressure regulator 15; a dome pressure regulator 17; a sensor pressure regulator 19; a dome/valve mechanism 21; and a pressure switch 23. Also illustrated is a chip pressure indicator 25; a dome pressure indicator 27; and a sensor pressure indicator 29. Further, the dome/valve mechanism 21 generally comprises a dome 31; and, a valve plate 33. Finally, a probe 35 is also illustrated in FIG. 1.

A high pressure air input line is connected via suitable conduits through the filter 11, which removes moisture from the incoming high pressure air, to the manifold 13. The manifold 13 has three output conduits. One conduit 14 runs to the chip pressure regulator 15, the second conduit 16 runs to the dome pressure regulator 17 and the third conduit 18 runs to the sensor pressure regulator 19.

The output conduit 20 of the chip pressure regulator extends through the wall of the dome 31 to the valve plate 33 where it communicates with a passageway that extends to the tip of the probe 35. The probe 35 extends orthogonally outwardly from the valve plate 33. The tip of the probe 35 includes a plurality of outlet apertures which allow the air pressure output of the chip pressure regulator 15 to blow chips and other airborne particles away from the probe tip. In this manner, chips and other airborne particles will not create false touche' signals by moving the probe with respect to the master part. The chip pressure indicator 25 is connected to the output conduit 20 of the chip pressure regulator 19 and indicates the pressure of the air passing therethrough.

The output conduit 22 of the dome pressure regulator 17 is connected to the wall of the dome 31 and the air carried by it pressurizes the interior of the dome. The valve plate 33, while illustrated as being located at the bottom of the dome 31, could be located in other positions depending upon the desired orientation of the probe 35. In any event, air pressure in the dome 31 presses the valve plate 33 against a suitable valve seat. The dome pressure indicator 27 is connected to the output conduit 22 of the dome pressure regulator 17 and indicates the pressure of the air in the dome.

The output conduit 24 of the sensor pressure regulator 19 is connected to a sensor conduit 37 that is normally closed at one end by the valve plate 33. In addition, the other end of the sensor conduit 37 is connected to the pressure switch 23. The sensor pressure indicator 29 is connected to the output conduit 24 of the sensor pressure regulator and indicates the pressure applied to the pressure switch 23. The pressure switch 23 includes a pair of contacts 39 that are held open as long as air pressure is applied to a pressure operated element 41. When the air pressure applied to the pressure operated element 41 via sensor conduit 37 decreases to a particular level, the contacts 39 close and ground an output terminal 43.

In operation, as long as the valve plate is in its normal position, the associated outlet end of sensor conduit 37 is maintained closed, and an adequate amount of air pressure is applied to the pressure operated element 41 to maintain pressure switch contacts 39 open. When a touche' occurs, i.e., the tip of the probe 35 comes in contact with the master pattern 45 whose outline it is following, the valve plate 33 is pivoted about a pivot point 47 causing the associated outlet end of sensor conduit 37 to emit pressurized gas. This emission reduces the air pressure applied to the pressure operated element 41. This action causes the contacts 39 of the pressure switch 33 to close, whereby the output terminal 43 is grounded.

In summary, the invention provides a novel pneumatic sensor which includes a valve and a probe element that are entirely pneumatically operated. When a touche' occurs, a pressure reduction is created and causes the pressure switch to be activated. As will be better understood from the following description, the closing of the electrical contacts of the pressure switch causes the related numerically controlled machine tool to shutdown.

Figure 2:
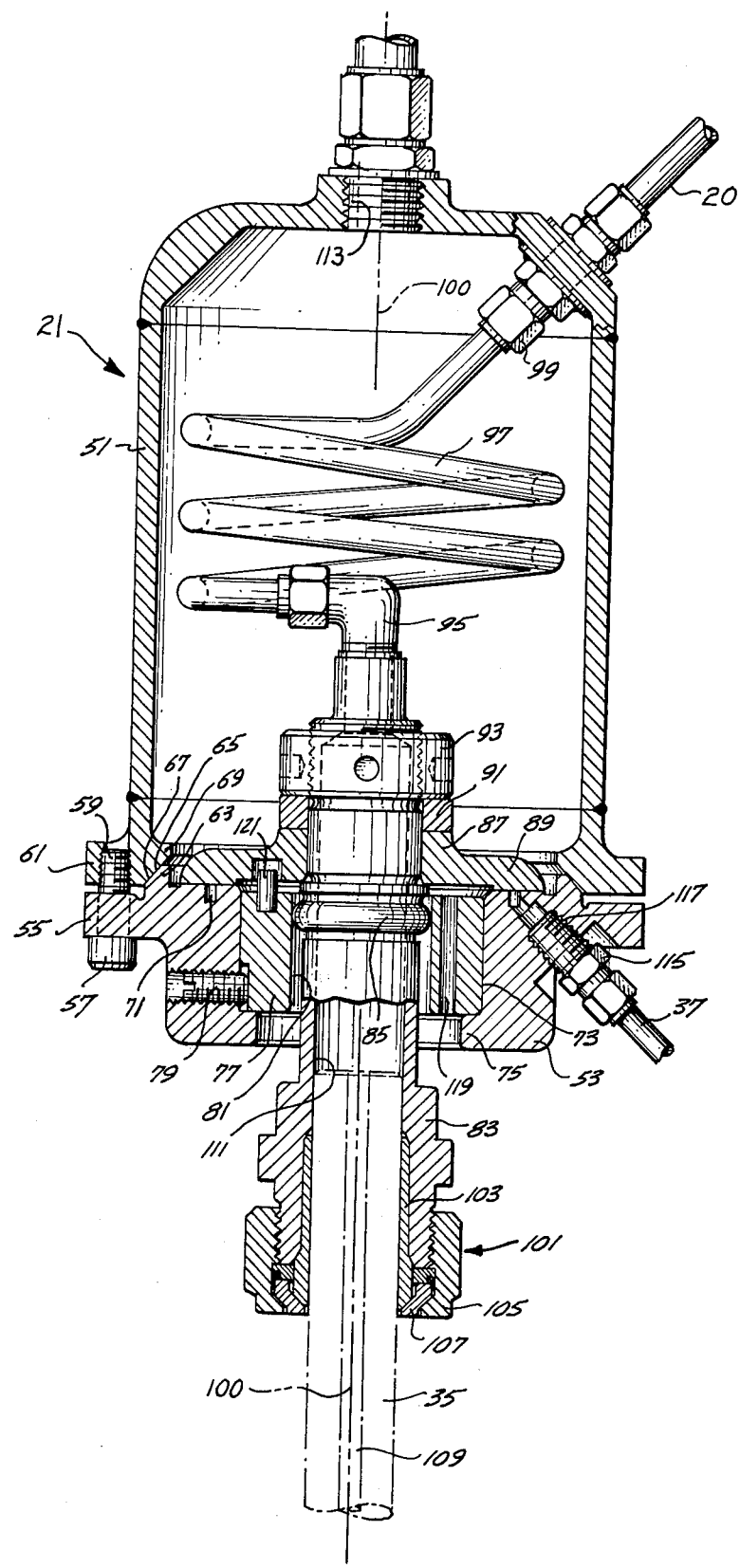
FIG. 2 is a cross-sectional diagram of a sensor valve assembly suitable for use in the pneumatic system illustrated in FIG. 1.

FIG. 2 is a cross-sectional view in somewhat more detail of a dome/valve mechanism 21 suitable for use in the pneumatic system illustrated in FIG. 1. The dome/valve mechanism illustrated in FIG. 2 comprises a generally cylindrical dome 51 which is open at one end and closed at the other end. Affixed to the open end is a valve seat 53. The valve seat 53 includes a peripheral shoulder 55 through which three adjustment cap screws 57 project, only one of which is viewable in FIG. 2. The cap screws 57 screw into aligned threaded apertures 59 located in a shoulder 61 projecting outwardly from the main portion of the dome 51 about its open end. Located immediately inwardly of the peripheral shoulder 55 of the valve seat 53 is annular projection 63 that projects into the open end of the dome 51. The annular projection 63 has a semi-spherical outer surface 65 that contacts a mating spherical surface 67 formed in an inward projection 69, located near the open end of the dome 51. It will be appreciated that the spherical interface, between the valve seat 53 and the dome 51, allows the cap screws to orient the valve seat in a plurality of positions within a predetermined range. Since the probe is attached to the valve seat, this mechanism allows the position of the probe to be adjusted.

Inwardly located from the annular projection 63 of the valve seat 53 is a sensing annular cavity 71. The annular cavity 71 is open at the dome end of the valve seat. Further, a central cylindrical aperture 73 extends entirely through the valve seat 53. An annular shoulder 75 projects inwardly at the end of the central cylindrical aperture 73 remote from the end containing the annular projection 63.

Mounted in the central cylindrical aperture 73 is a valve stem guide block 77. The valve stem guide block is cylindrical and impinges on the shoulder 75. The valve stem guide block is held in place by one or more set screws 79 which pass through the valve seat 53, transversely with respect to the cylindrical center aperture 73.

The valve stem guide block 77 includes a central aperture 81 through which a valve stem 83 passes. Extending outwardly from the valve stem 83 inside the central aperture 81 is a peripheral projection 85. The peripheral projection 85 is semi-spherical in cross-sectional shape and impinges on the inner surface of the aperture 81 of the valve stem guide block 77.

Affixed to the valve stem 83, inside of the dome 51, is a valve plate 87. The valve plate 87 includes an annular outer projection 89 that mates with the valve seat 53 so as to enclose the open end of the sensing annular cavity 71. Surrounding the valve stem 83, on the other side of the valve plate 87, is a spacer 91. Mounted on the other side of the spacer 91, about the valve stem 83, is a retaining collar 93. The retaining collar 93 may, for example, be threaded onto a threaded portion of the valve stem 83. The portion of the valve stem 83 terminating inside the dome 51 is necked down and has affixed thereto one end of an elbow 95. The elbow 95, in turn, is attached at its other end to a helical conduit 97. The helical conduit is connected at its other end to a coupler 99 which passes through the wall of the dome 51 and is attached at its other end to the chip pressure output conduit 20.

It is pointed out here that the valve seat 53, the valve stem guide block 77, the valve stem 83 and the valve plate 87 are all coaxially arrayed about a common central axis 100.

Affixed to the outer end of the valve stem 83 is a chuck 101 comprising a collet 103, mounted in a central aperture 111 formed in the valve stem 83, and a surrounding collar 105 and cam 107 adapted to cooperate to move the collet's arms inwardly and outwardly. The collar 105 is threaded onto the lower end of the valve stem 83 whereby it is movable longitudinally. Longitudinal movement of the collar 105 longitudinally moves the cam 107, which action causes the collet's arms to move inwardly and outwardly. Mounted in the chuck 101 is the probe 35. The probe 35 projects outwardly and includes a longitudinal aperture 109 which communicates with the central aperture 111 formed in the valve stem 83. The valve stem central aperture 111 in turn communicates with the helical tube 97 via the elbow 95. In this manner, a fluid passageway exists from the chip pressure regulator outlet conduit 20 to the probe 35. As discussed above, the probe tip includes apertures that allow the high pressure air flowing through the probe to blow chips and other debris away from the region surrounding the probe's tip.

Located in one wall (illustrated as the top wall) of the dome 51 is a threaded aperture 113 into which a suitable coupling element 114 is threaded. The coupling element is adapted to affix the dome pressure regulator output conduit 22 to the dome 51 in a manner such that the dome is pressurized by the air output of the dome pressure regulator 17.

A sensor coupling element 115 is mounted in a suitably threaded aperture 117 formed in the valve seat 53 and is connected at its outer end to the sensor conduit 37. The threaded aperture 117 necks down at its inner end and is in communication with the annular cavity 71. In this manner, the air output of the sensor pressure regulator is conveyed to the annular cavity 71. As long as the valve is closed, the annular cavity 71 is closed by the valve plate 87 and the air is trapped. When the valve is open, however, air from the annular cavity is allowed to exit therefrom and, thereby, reduce the pressure in the sensor line 37. Air exiting from the annular cavity 71 leaves the dome/valve mechanism 21 via a cylindrical aperture 119 formed in the valve stem guide block 77 adjacent to its central aperture 81.

In addition to the foregoing structure, a pin 121 lies in a suitably aligned aperture formed in the valve stem guide block 77 and the valve plate 87 and prevents these elements from rotating with respect to one another about the common central axis 100.

It will be appreciated from the foregoing description that the dome/valve mechanism 21 illustrated in FIG. 2 is adapted to perform the function of the dome/valve mechanism illustrated in FIG. 1 and described above. In general, the valve stem includes a chuck adapted to retain the probe which supplies blow-off air to the tip thereof. The peripheral projection 85 guides the valve stem for translational probe movement along the common central axis 100, and acts as a fulcrum to initiate valve action when probe deflection occurs. The valve plate in turn includes a lapped mating surface that normally closes the annular cavity 71. The annular cavity, thus, creates a sensor pressure chamber. The periphery of the valve plate acts as a pivot point and, in conjunction with the large diameter of the valve plate, multiplies the rate of valve opening with respect to a particular probe deflection. Preferably, the multiplication rate is three-to-one.

The valve seat in general combines a mounting ring, a spherical mating seal, a recess for mounting the valve stem guide block, an annular cavity, which forms the sensor pressure chamber, and a pressure sensing port. The dome in turn contains a matching spherical surface, which receives the valve seat. The matching surface not only seals the dome to the valve seat, but also allows three point adjustment mounting for obtaining precision alignment of the probe with respect to the spindle axis of the cutting element. Pressurization of the dome provides an infinitely variable spring force to balance the lifting force created by the probe. Thus, pressurization of the dome determines the sensitivity of the overall sensor structure. This arrangement also automatically resets the sensor assembly, particularly the valve seat, upon removal of the disturbing force created by a touche'.

The pressure sensor is a precision pressure switch, preferably adjustable, which monitors any drop in the static pressure in the pressure sensing conduit 37. When the probe contacts the master pattern and the valve seal is disturbed, as discussed above, the resultant pressure drop causes the pressure sensor switch to initiate a touche' signal, by grounding its output terminal 43. The touche' signal controls an electronic circuit in the manner hereinafter described.

Figure 3:
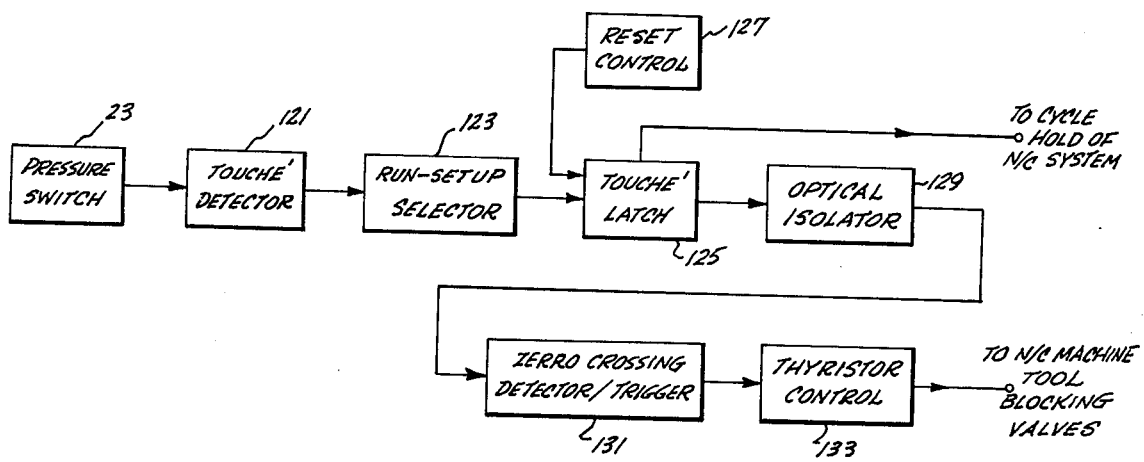
FIG. 3 is a block diagram of the electronic portion of the pneumatic sensor system of the invention.

FIG. 3 is a block diagram of an electronic system adapted to sense a touche' signal and control the shutdown of the related N/C machine tool when such a signal occurs. Preferably, the electronic detector is formed entirely of solid state components. When a touche' signal occurs, the electronic system initiates action of the axis motion control valves of the numerically controlled machine tool. Because the system is solid state, the response time is substantially faster than it would be if relay logic controls were used. Thus, the possibility of producing a part, prior to shutdown, falling outside of acceptable tolerance ranges is greatly reduced with the invention. In fact, rapid electronic response time is required in order to recover the differential response time loss occurring during pneumatic probe deflection over the fixed response time of an entirely electronic touche' detector, i.e., a prior art touche' detector utilizing an entirely electronic sensing approach, as discussed above.

The electronic system illustrated in FIG. 3 comprises: the pressure switch 23; a touche' detector 121; a run-setup selector 123; a touche' latch 125; a reset control 127; an optical isolator 129; a zero crossing detector/trigger 131; and, a thyristor control 133.

The output of the pressure switch 23 is connected to the touche' detector 121. The touche' detector converts the pressure sensor contact closure to a logic level signal output. That is, the touche' detector detects when contacts 39 close and, in accordance therewith, creates an output signal of the correct polarity and voltage level. This circuit provides a clean voltage transition between the off and on (touche') states of contacts 39 and, thus, eliminates the effects of contact bounce created by a fast acting pressure operated element 41.

The output of the touche' detector 121 is connected through the run-setup selector 123 to the set input of the touche' latch 125. The run-setup selector 123 has run and set-up modes of operation. In the run mode of operation, the output of the touche' detector 121 is connected directly to the set input of the touche' latch 125. In the set-up mode of operation, the run-setup selector inhibits touche' signals. That is, the output of the touche' detector is inhibited from being applied to the set input of the touche' latch 125. Basically, the run-setup selector allows the machine operator to position the machine tool without causing an unwanted emergency stop to occur during starting point setup should he bring the probe into contact with the master pattern. In other words, the run-setup selector is a manually operated device which inhibits the passage of touche' signals during the machine setup period. In its simplest form, it could be simply an SPST switch.

The reset control 127 is connected to the reset input of the touche' latch 125. Preferably, the reset is activated by a manual operator actuated push button and includes a one-shot monostable multivibrator that provides a "clear latch" ground signal for 100 milliseconds. The one-shot grounding pulse eliminates contact bounce resulting from the manual push button operation and insures that the latch is not mis-triggered during the reset period. The latch can only be reset if the touche' signal has been removed i.e., the probe has been returned to an aligned position.

The touche' latch 125 may take on a plurality of forms well known in the art. For example, it could be formed of a single silicon controlled rectifier (SCR) or a pair of cross coupled NOR gates. Still further, it could be formed by a suitable flipflop. In any event, the touche' latch generates two output signals when it is set by an output signal from the touche' detector. One output signal is applied to the cycle hold input of the numerical control system controlling the N/C machine tool. This output of the touche' latch halts interpolation by the numerical control system. Thus, when the touche' latch is set, the numerical control system is "told" to cycle to a hold mode of operation. This action halts all axis motion command signals, causing an immediate deceleration on all axes of movement of the cutter of the numerical control machine tool.

The second signal of the touche' latch is applied to the input of the optical isolator 129. The optical isolator isolates the low voltage portion of the electronic system from the high voltage portion. The low voltage portion comprises the pressure switch, the touche' detector, the run-setup selector, the touche' latch and the reset control. The high voltage portion comprises the zero crossing detector/trigger 131 and the thyristor control 133.

The output of the optical isolator 129 is connected to the input of the zero crossing detector/trigger. The optical isolator primarily eliminates unwanted ground loops, inductive spikes, AC line noise, etc. from feeding back to the low voltage (logic) portion of the circuit. When the optical isolator is commanded to do so by the touche' latch, it applies a signal to the zero crossing detector/trigger.

The zero crossing detector/trigger is connected to control the energizing and deenergizing of the thyristor control 133. The zero crossing detector/trigger provides interference and transient free turn-on of the thyristors. This is accomplished by AC line synchronization of the turn-on signal to the thyristor operation. More specifically, the turn-on (triggering) of the thyristors is inhibited until the AC line current is passing through zero. This condition is detected by the detection portion of the zero crossing detector/trigger 131 in a conventional manner. Preferably, a DC voltage is used for the turn-on signal and holds the thyristors in conduction until the touche' latch is reset. The thyristors always halt conduction at zero current when a trigger signal is removed i.e., they are self-synchronized for turn off. Thus, no transient voltage is developed due to stored inductive energy in the blocking valve loads.

The thyristor control utilizes by-directional triode thyristors to provide solid state alternating current control of the machine tool axis motion blocking valves. That is, the thyristors are controlled in the manner previously described to control the flow of current to the machine axis control blocking valves. These valves, as is well known in the art, control the flow of hydraulic fluid to hydraulic servo drives. When they are deactivated, the flow of hydraulic fluid to the hydraulic servo drives is blocked and all axis motion is halted. The end result is that a solid mechanical or valved stop occurs.

It will be appreciated from the foregoing description of a preferred embodiment that the invention provides a new and improved sensor system suitable for use in combination with a numerically controlled machine tool to promote the fail-safe operation of such a tool. Because the sensor system utilizes a pneumatic sensor, the problems associated with electronic sensors, wherein a probe/master pattern current flow occurs, when the probe comes in contact with the master are eliminated. Further, because arcing at the probe tip is eliminated, the probe can be made such that the gap between it and the master pattern is reduced by one order of magnitude over the gap that exists when current carrying probes are used. Moreover, because the probe includes a mechanism for blowing chips and other airborne particles away from its tip, these particles cannot cause false touche' signals. Also, because the probe is flexibly mounted in a valve seat, it is unlikely to be damaged and misaligned when a touche' occurs. Thus, the invention overcomes many of the prior art disadvantages discussed above, and provides an improved N/C machine tool.

While a preferred embodiment of the invention has been illustrated and described, it will be appreciated that various changes can be made therein without departing from the spirit and scope of the invention. For example, other types of specific electronic sensing and signal generating circuits other than the ones specifically illustrated and described can be used by the invention. Further, other types of pressure sensing switches, such as one where a pair of contacts open rather than close when a touche' occurs, can be utilized by the invention, as long as the electronic system is adapted to sense and be operated by such opening. Moreover, the dome/valve mechanism can be varied in a variety of manners, as required by a particular environment of use. Thus, the invention can be practiced otherwise than as specifically described herein.

It is pointed out here that the particular mounting mechanism for the dome/valve mechanism has not been illustrated and described, because it will be dependent upon the specific machine with which the invention is used and because suitable mounting mechanisms will be apparent to those skilled in the art. It is also pointed out here that in some N/C machine tools the cutter remains stationary and the raw material to be cut is moved. The invention is also useful in such tools; however, it will remain stationary along with the tool as the master pattern is moved in a path of travel corresponding to the desired path of travel of the raw material.

The embodiments of the invention in which an exclusive property or privilege is claimed are defined as follows:

1. A pneumatic sensor system comprising:
   a pneumatic valve mechanism including a movable element and a valve seat, said valve seat having a cavity formed therein and being adapted for the application of pneumatic pressure into said cavity, said movable element being mounted relative to said valve seat for closure of said cavity to form a pressure sensing chamber, said movable element being displaceable relative to said valve seat for opening said pressure sensing chamber to allow a drop in the pneumatic pressure applied to said cavity;
   a probe connected to said movable element in a manner such that displacement of said probe displaces said movable element of said valve mechanism and opens pressure sensing chamber;
   pneumatic pressure sensing means connected in fluid communication with said valve seat cavity for sensing drops in pneumatic pressure applied to said cavity; and,
   electronic control means connected to said pneumatic pressure sensing means for detecting when said pneumatic pressure sensing means detects drops in the pneumatic pressure applied to said cavity of said valve seat and for generating control signals in accordance therewith.

2. A pneumatic sensor system as claimed in claim 1 wherein said valve assembly also includes a dome having an open end, said valve seat being attached to said open end of said dome in a manner such that said movable valve element is located in said dome.

3. A pneumatic sensor system as claimed in claim 2 wherein said probe includes a passageway which terminates in at least one aperture formed in the end of said probe remote from said movable valve element, said pneumatic sensor system further comprising a conduit connected for supplying pneumatic pressure to said passageway of said probe, said aperture in said end of said probe exhausting pressurized fluid when said pneumatic pressure is supplied to said passageway of said probe.

4. A pneumatic sensor system as claimed in claim 3 wherein said movable valve element comprises a valve plate having an annular projection and wherein said cavity in said valve seat is an annular groove closable by said valve plate annular projection to form said pressure sensing chamber.

5. A pneumatic sensor system as claimed in claim 4 wherein said valve mechanism includes an elongated valve stem having longitudinal axis, said valve plate being attached to one end of said valve stem, said valve stem extending through said valve seat, said probe affixed to the end of said valve stem remote from the end to which said valve plate is attached so as to lie along said longitudinal axis.

6. A pneumatic sensor system as claimed in claim 5 including a valve stem guide block mounted in a centrally located aperture formed in said valve seat about said longitudinal axis, said valve stem guide block including a central aperture also located along said longitudinal axis; and, wherein said valve stem includes a peripheral projection formed and positioned so as to impinge on said central aperture formed in said valve stem guide block and act as a fulcrum point for said valve stem.

7. A pneumatic sensor system as claimed in claim 2 wherein said open end of said dome includes a spherical mating surface, said valve seat including a spherically contoured surface for mating with said spherical mating surface of said dome; said pneumatic sensor system further including adjustment cap screws adapted to attach said valve seat to said dome in a manner such that the positioning of said cap screws establishes the position of said spherically contoured surface of said valve seat within said spherical mating surface of said some, said valve seat position, in turn, positioning said movable element and said probe.

8. A pneumatic sensor system as claimed in claim 1 wherein said electronic control means includes a low voltage section and a high voltage section.

9. A pneumatic sensor system as claimed in claim 8 wherein said low voltage section comprises:
- a detector connected to said pressure sensing means for detecting when said pressure sensing means detects that said movable element has been displaced to allow the fluid pressure supplied to said valve seat cavity to drop, said detector including means for supplying a signal in accordance therewith;
- a latch connected to the output of said detector and latched when said detector supplies said signal indicating that said pressure sensing means has detected that said valve plate has been displaced, said latch including means for supplying a signal indicating that said latch is latched; and
- an optical isolator connected for receiving said signal supplied by said latch, said optical isolator including means for supplying a signal to said high voltage section when said latch is latched.

10. A pneumatic pressure sensor as claimed in claim 21 wherein said high voltage section comprises:
- a zero crossing detector/trigger connected for receiving said signal supplied by said optical isolator, said zero crossing detector/trigger including means for generating a trigger signal when said optical isolator senses that said latch is latched and an associated AC voltage passes through zero; and,
- a thyristor control connected for receiving said trigger signal, said thyristor control being activated when said zero crossing detector/trigger generates said trigger signal.

11. A pneumatic sensor comprising:
- a dome having a first opening at one end thereof, said dome including a second opening for introducing pneumatic pressure into said dome;
- a valve seat affixed to said first opening of said dome, said valve seat including a substantially smooth surface facing said first opening of said dome, said valve seat including a centrally located opening extending from said relatively smooth surface of said valve seat and passing completely through said valve seat, said relatively smooth surface of said valve seat including an annular cavity positioned to surround said centrally located opening, said valve seat including a first aperture for introducing pneumatic pressure into said annular cavity, said valve seat further including a second aperture located between said centrally located opening and said annular cavity, said second aperture extending from said relatively smooth surface of said valve seat and passing completely through said valve seat;
- a valve plate having at least one relatively smooth surface mounted and arranged for contacting said relatively smooth surface of said valve seat, said relatively smooth surface of said valve plate extending outwardly over said annular cavity and said second aperture of said valve seat, said relatively smooth surface of said valve plate substantially sealing said annular cavity to prevent pneumatic pressure introduced in said first aperture of said valve seat from reaching said second aperture when said relatively smooth surface of said valve plate contacts said relatively smooth surface of said valve seat; and
- an elongate valve stem having a first end connected to the central region of said relatively smooth surface of said valve plate, said valve stem projecting outwardly through said centrally positioned opening of said valve seat, said valve stem deflectable for moving said valve plate into a position wherein at least a portion of said relatively smooth surface of said valve plate does not contact said relatively smooth surface of said valve seat to permit pneumatic pressure to escape from said annular cavity through said second aperture of said valve seat.

12. A pneumatic sensor as claimed in claim 11 wherein said valve stem includes a passageway which terminates in at least one aperture formed in the end of said valve stem remote from said valve plate, said passageway for permitting pneumatic pressure to flow through said valve stem, and wherein said pneumatic sensor further comprises a pneumatic conduit connected to said passageway for introducing pneumatic pressure into said passageway, said pneumatic conduit passing through said dome and connectable to a pneumatic pressure source.

13. A pneumatic sensor as claimed in claim 11 wherein said valve stem includes a peripheral projection formed and positioned so as to impinge on said central opening of said valve seat, said valve stem pivotable about said peripheral projection when said valve stem is angularly deflected to cause said valve plate to move into said position wherein at least a portion of said relatively smooth surface of said valve plate does not contact said relatively smooth surface of said valve seat.

14. A pneumatic sensor as claimed in claim 11, wherein the end of said valve stem remote from said valve plate includes connecting means for attaching said valve stem to a probe.

15. A pneumatic sensor as claimed in claim 11 further comprising pneumatic sensing means pneumatically coupled to said first aperture of said valve seat for sensing drops in pneumatic pressure when deflection of said valve stem moves said valve plate to permit pneumatic pressure to escape from said annular cavity.

* * * * *

UNITED STATES PATENT AND TRADEMARK OFFICE
CERTIFICATE OF CORRECTION

PATENT NO. : 4,081,734

DATED : March 28, 1978

INVENTOR(S) : Floyd E. MacSpadden et al.

It is certified that error appears in the above-identified patent and that said Letters Patent are hereby corrected as shown below:

Column 1, line 4, delete "continuation".

Column 11, line 24, delete "21" and insert therefor —9—.

Signed and Sealed this

Seventeenth Day of October 1978

[SEAL]

Attest:

RUTH C. MASON
Attesting Officer

DONALD W. BANNER
Commissioner of Patents and Trademarks